(12) United States Patent
Milanowski

(10) Patent No.: US 9,469,991 B2
(45) Date of Patent: Oct. 18, 2016

(54) COLLAPSIBLE LATTICE

(71) Applicant: Universal Consumer Products, Inc., Grand Rapids, MI (US)

(72) Inventor: Daniel J. Milanowski, Grand Rapids, MI (US)

( * ) Notice: Subject to any disclaimer, the term of this patent is extended or adjusted under 35 U.S.C. 154(b) by 0 days.

(21) Appl. No.: 14/796,026

(22) Filed: Jul. 10, 2015

(65) Prior Publication Data

US 2016/0010331 A1 Jan. 14, 2016

Related U.S. Application Data

(60) Provisional application No. 62/023,997, filed on Jul. 14, 2014.

(51) Int. Cl.
*F16C 11/04* (2006.01)
*E04H 17/00* (2006.01)
*E04C 2/40* (2006.01)
*E04C 2/42* (2006.01)

(52) U.S. Cl.
CPC .............. *E04C 2/405* (2013.01); *E04C 2/42* (2013.01); *F16C 11/04* (2013.01)

(58) Field of Classification Search
CPC ........... E04C 2/405; E04C 2/42; F16C 11/04
See application file for complete search history.

(56) References Cited

U.S. PATENT DOCUMENTS

| | | | | | |
|---|---|---|---|---|---|
| 3,153,975 | A | * | 10/1964 | Rapata | F16B 5/128 24/295 |
| 3,307,504 | A | * | 3/1967 | Cloyd | B65D 19/0069 108/56.1 |
| 3,385,157 | A | * | 5/1968 | Rapata | E05B 79/12 411/41 |
| 5,704,592 | A | * | 1/1998 | White | E01F 13/028 160/135 |
| 6,398,295 | B2 | * | 6/2002 | Asai | B60J 3/0221 296/146.7 |
| 6,634,693 | B2 | * | 10/2003 | Straesser, Jr. | B60K 37/00 180/90 |
| 7,900,417 | B1 | * | 3/2011 | Leines | E04C 3/06 52/650.3 |

* cited by examiner

*Primary Examiner* — Jeanette E Chapman
(74) *Attorney, Agent, or Firm* — McGarry Bair PC

(57) ABSTRACT

A lattice comprising two intersecting laths and a pivoting connector locating at the intersection between the laths that includes a male retainer and a female retainer that interlock so as to connect the laths together. The male and female retainers interlock such that the laths may pivot about the connector from an expanded framework configuration to a collapsed framework configuration of the lattice.

19 Claims, 9 Drawing Sheets

COLLAPSIBLE LATTICE

CROSS REFERENCE TO RELATED APPLICATION(S)

This application claims the benefit of U.S. Provisional Patent Application No. 62/023,997, filed Jul. 14, 2014, which is incorporated herein by reference in its entirety.

BACKGROUND

A lattice is defined as a framework or structure of wood, metal, plastic or other material made by crossing laths or other thin strips of material so as to form a network. Lattices are commonly used as a decorative skirting to cover the underside of structures including decks, ramps, porches, balconies and stairs as well as in fencing systems as structural or decorative components.

BRIEF SUMMARY

According to one embodiment of the invention, a lattice movable between a collapsed configuration and an expanded configuration includes a plurality of laths including a first lath crossing a second lath at an intersection, and a pivoting connector located at the intersection between the first lath and the second lath. The pivoting connector includes a male retainer comprising a body having at least one exterior perimetrical lip and a plurality of recesses in a spaced relationship, and a female retainer comprising an opening and a plurality of detents extending into the opening in a common alignment with the plurality of recesses on the male retainer, wherein, when the opening in the female retainer is positioned within the perimetrical lip on the male retainer, the female retainer is thereby pivotally mounted to the male retainer, and the positioning of the detents on the female retainer within the corresponding recesses on the male retainer corresponds to the expanded configuration of the lattice.

DETAILED DESCRIPTION

Figure 1:
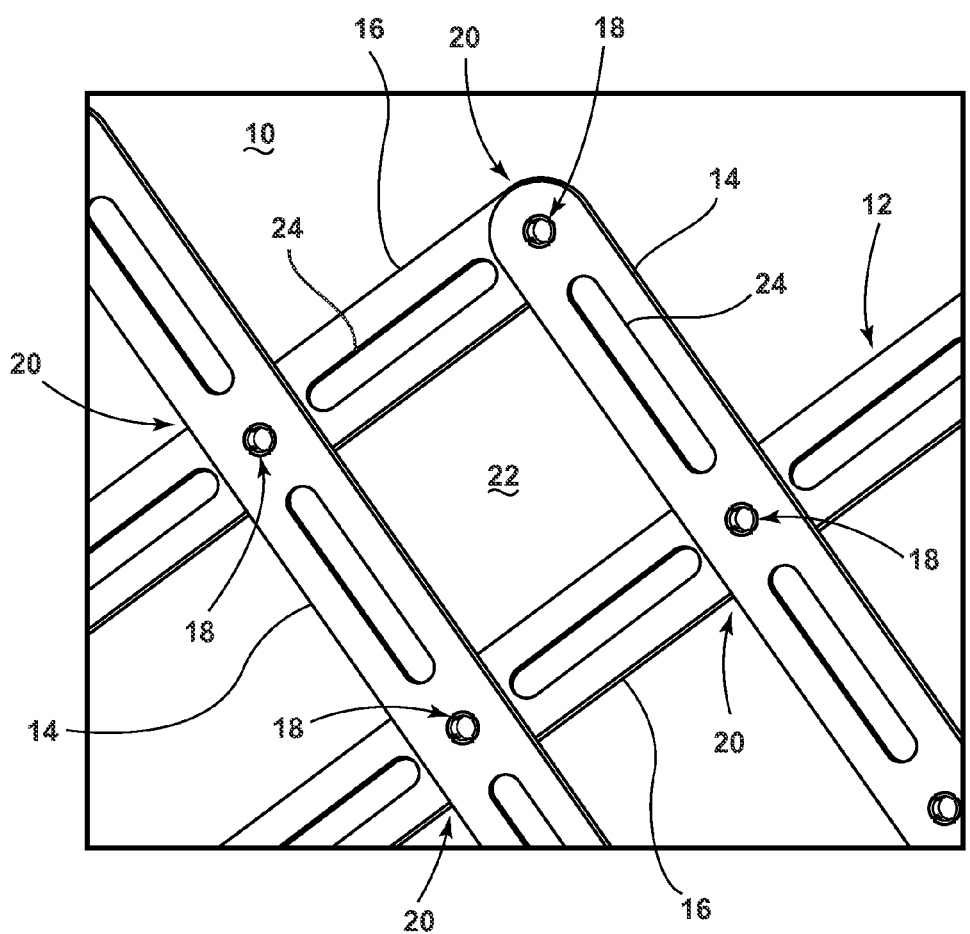
FIG. 1 is a front view of the lattice having an expanded framework according to a first embodiment of the invention.

FIG. 1 is a front view of a lattice 10 having an expanded framework according to a first embodiment of the invention.

The lattice comprises a framework 12 including a plurality of first laths 14 and a plurality of second laths 16 connected or mounted together by a plurality of interlocking connectors 18. A series of the first laths 14 cross a series of the second laths 16 at intersections 20, and the interlocking connectors 18 connect the laths 14, 16 at the intersections 20 to form intersecting joints. The lattice 10 can be moved between the expanded configuration shown, and a collapsed configuration shown in FIG. 2. The connectors 18 allow the lath 14, 16 to pivot relative to each other when moving the framework between the collapsed and expanded configurations.

The first and second laths 14, 16 are formed from strips of material including, but not limited to, plastic, wood, metal, fiberglass, or composites or combinations thereof, and may have any desired width, thickness and length. The first and second laths 14, 16 may also have one or more slots 24 formed between the intersecting joints having the interlocking connectors 18. A singe, elongated slot 24 may be provided between the intersections 20, as shown herein. Alternatively, various other slot designs can be employed on the laths 14, 16 to impart various aesthetic appearances to the lattice 10.

When in the expanded configuration as illustrated in FIG. 1 the first and second laths 14, 16 are perpendicular to each other, with spaces or voids 22 formed therebetween so as to create an open framework. The voids 22 may generally be defined by four of the connectors 18 or intersections 20. Further in the expanded configuration, the first laths 14 lie parallel to each other, and the second laths 16 lie parallel to each other. Any number of interlocking connectors 18 and first and second laths 14, 16 can be used and depends on the desired height, width and size of the lattice 10, and the desired size of the voids 22 when the lattice is expanded. For example, depending on the spacing and configuration of the connectors 18, the voids 22 may be square or diamond shaped.

Figure 2:
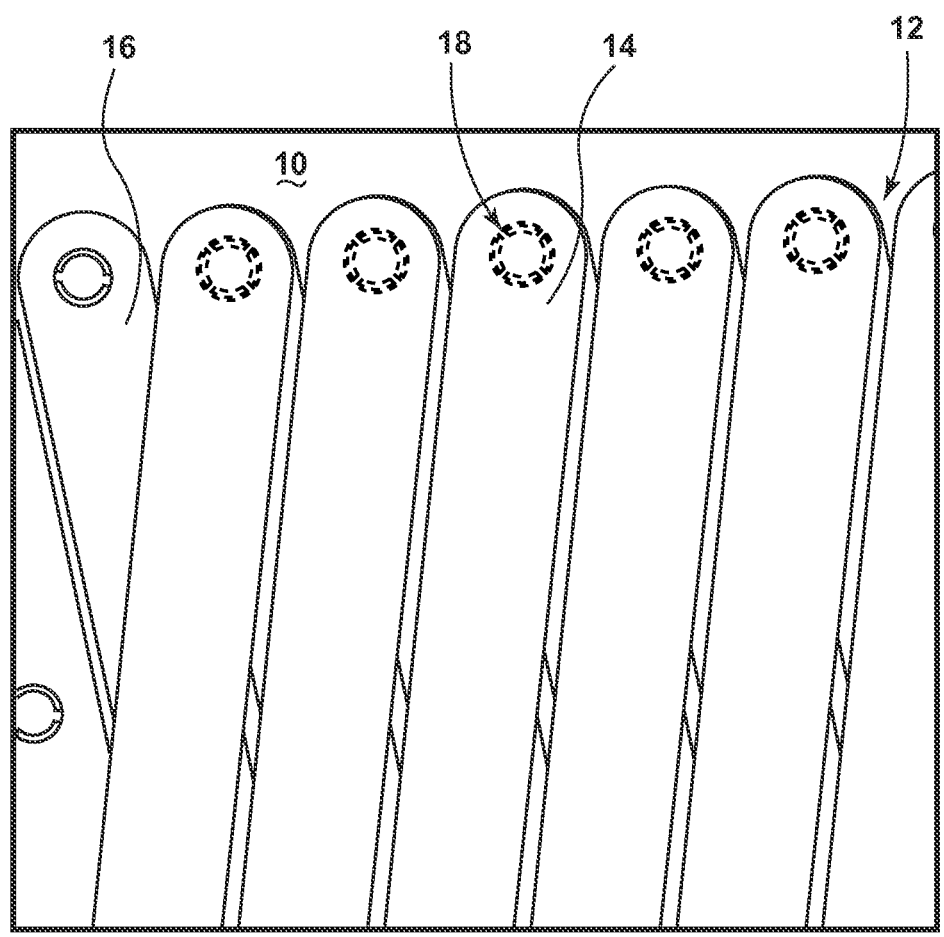
FIG. 2 is a front view of the lattice of FIG. 1 having a collapsed framework.

FIG. 2 is a view of the lattice 10 from FIG. 1 having the framework 12 in a collapsed configuration. When in the collapsed configuration, the first and second laths 14, 16 can substantially abut each other such that no voids between the first and second laths 14, 16 are present, although small gaps between the laths 14, 16 may still be present in the collapsed configuration.

To change the configuration of the lattice 10 from the expanded configuration to the collapsed configuration, the first and second laths 14, 16 are pivoted towards each other about the interlocking connectors 18.

In a preferred embodiment, the first and second laths 14, 16 are made of plastic and are injection molded. The plastic may be any suitable plastic such as high density polyethylene, low density polyethylene, polyethylene terephthalate, polypropylene or polystyrene. Preferably, the connectors 18 are also made from plastic. Using plastic for the laths 14, 16, the interlocking connectors 18 can be molded directly with the laths 14, 16 in the required shaped and configuration. Using plastic can also permit the laths 14, 16 to be collapsed and expanded many times without wear. A plastic lattice 10 also requires less maintenance than wood.

Figure 3:
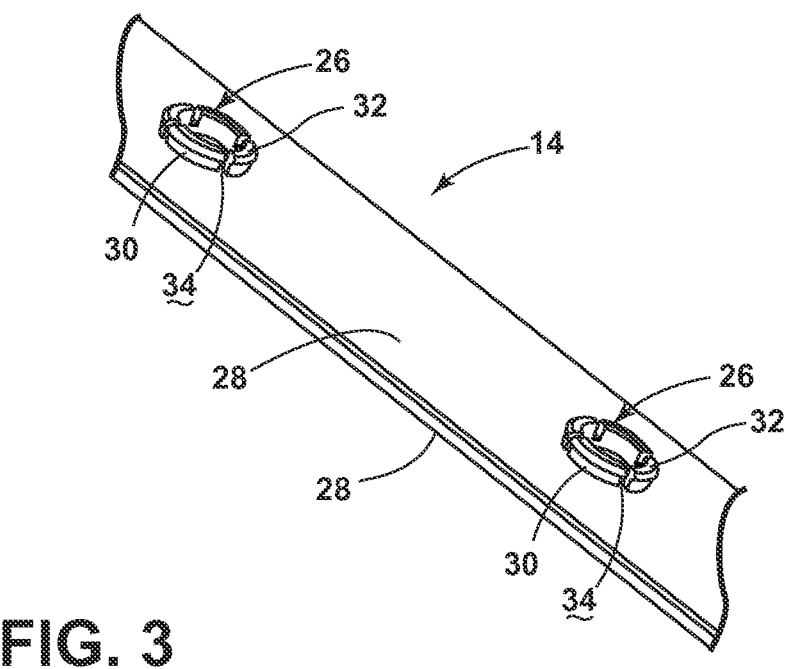
FIG. 3 is a perspective view of a lath from the lattice of FIG. 1 having a male connector.

FIG. 3 is a perspective view of the first lath 14 having a plurality of male retainers or connectors 26. The male connectors 26 are spaced along the first lath 14. The lath 14 can comprise an elongated strip having opposing flat surfaces 28. The male connectors 26 can all be provided on one of the flat surfaces 28; alternatively male connectors 26 can be provided on both flat surfaces 28.

Figure 4:
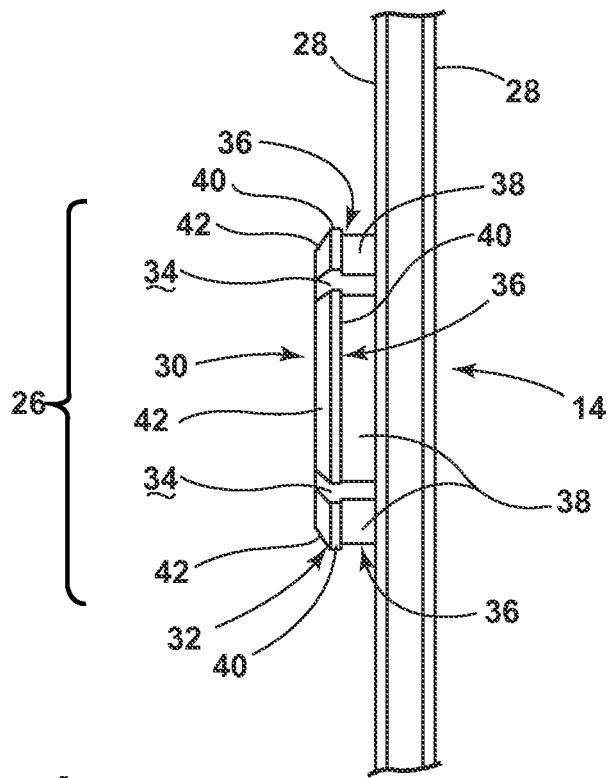
FIG. 4 is a side view of FIG. 3.

The male retainers or connectors 26 can include a body 30 having at least one exterior perimetrical lip 32 and a plurality of recesses 34 in a spaced relationship. As seen in FIG. 4, the male connectors 26 comprise bodies 30 in the form of a series of cantilever projections 36 extending away from the flat surface 28 of the first lath 14. The cantilever projections 36 each comprise a leg 38 extending perpendicular to the flat surface 28 and a flange 40 having a inclined surface 42 extending perpendicular to the legs 38. The inclined surface 42 can taper in a direction away from the leg 38, thereby forming a tapered outer surface. The height of the legs 38 is configured to correspond to the thickness of the second lath 16 (FIG. 1).

The flanges 40 collectively form the perimetrical lip 32, with the gaps or recesses 34 disposed between the legs 38 and/or flanges 40 of the cantilevered projections 36. The cantilevered projection 36 may be arranged in a ring, such that the male connector 26 is generally circular in shape. The flanges 40 making up the perimetrical lip 32 may be made of compliant material such that is deflects when the interlocking connection is made. The legs 38 may also be made of compliant material.

Figure 5:
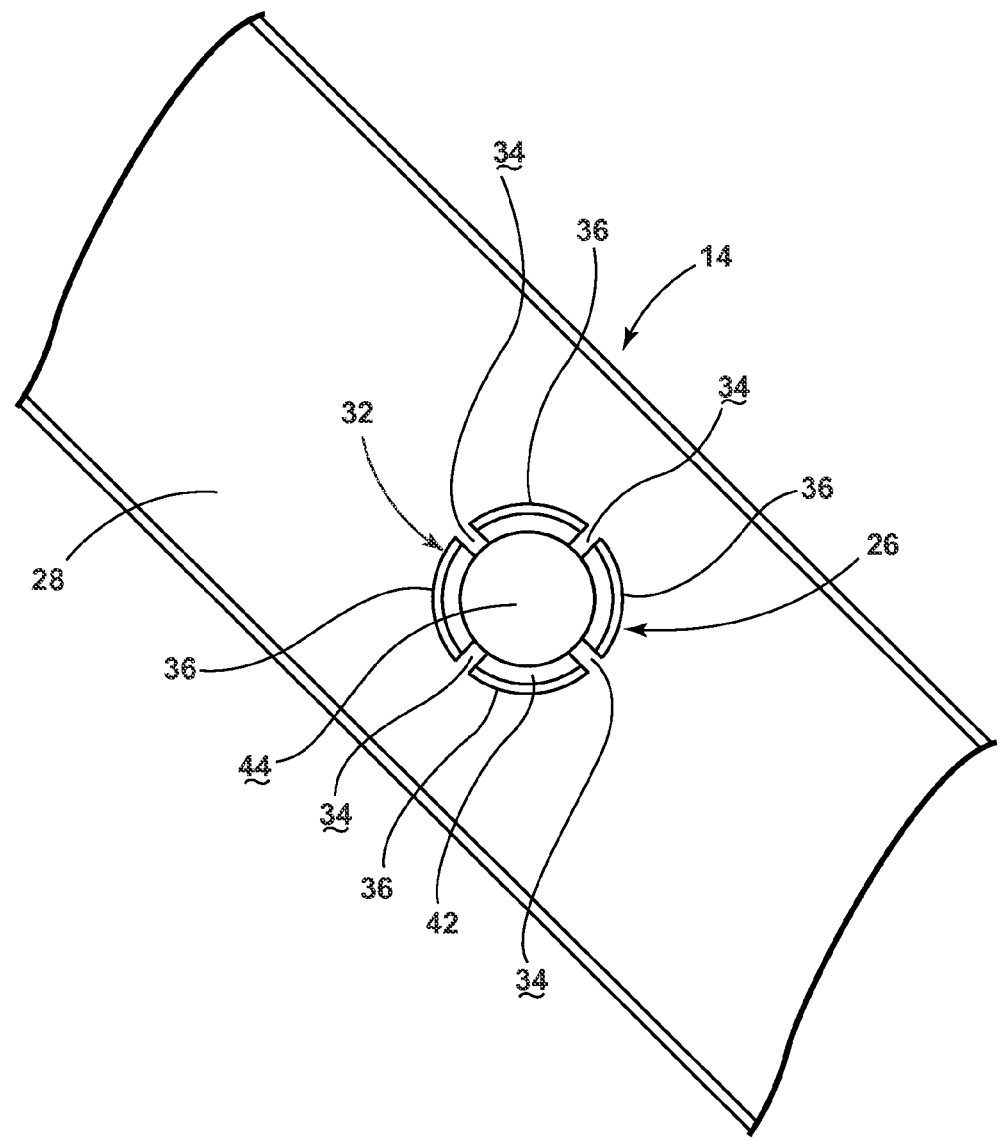
FIG. 5 is a rear view of FIG. 3.

As seen in FIG. 5, the cantilever projections 36 are spaced apart from one another to form gaps to provide the recesses 34. The cantilever projections 36 may be arced or semi-circular, and together the body 30 defined by the cantilever projections 36 and recesses 34 forms a circular-shaped plug defining an annular inner aperture 44. The lip 32 extends laterally outwardly from the aperture 44 in the lath 14. The annular inner aperture 44 may be closed or covered by a portion the first lath 14 so as to not extend all the way through the lath 14 or may be hollow as illustrated.

Figure 6:
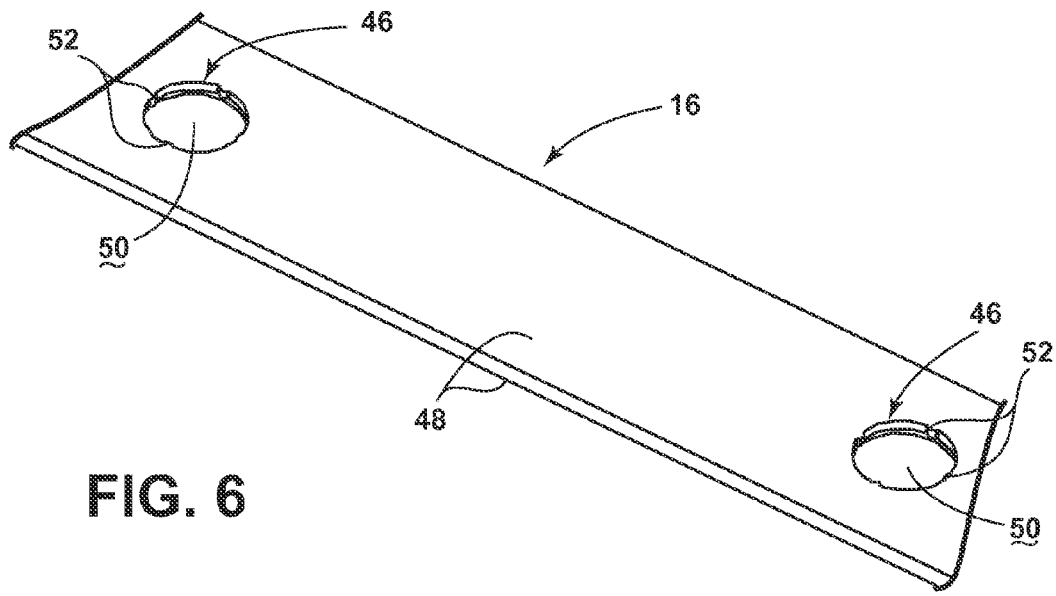
FIG. 6 is a perspective of a lath from the lattice of FIG. 1 having a female connector.

FIG. 6 is a perspective of the second lath 16 having a plurality of female retainers or connectors 46. The female connectors 46 are spaced along the second lath 16 at distances corresponding to the spacing of the male connectors 26 along the first lath 14 shown in FIG. 3. The lath 16 can comprise an elongated strip having opposing flat surfaces 48. The female connectors 46 can all be provided on one of the flat surfaces 48; alternatively female connectors 46 can be provided on both flat surfaces 48, or, as shown herein, can extend through both flat surfaces 48 of the lath 16.

Figure 7:
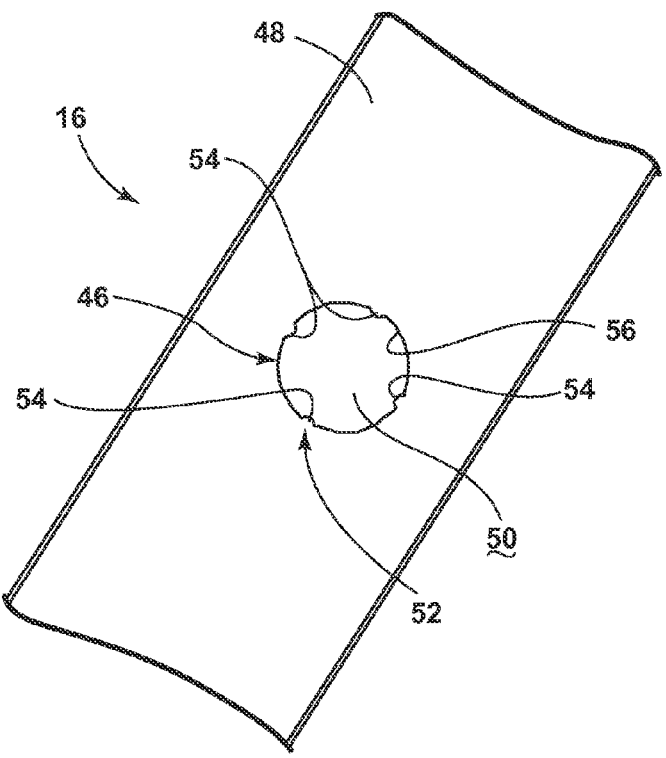
FIG. 7 is a rear view of FIG. 6.

The female retainers or connectors 46 can include an opening 50 and a plurality of detents 52 extending into the opening 50. As seen in FIG. 7, the female connectors 46 can comprise an opening in the form of an annular aperture 50 having detents 52 in the form of rounded protrusions 54 formed along a perimeter 56 of the annular aperture 50 and extending inwardly from the perimeter 56 into the aperture 50. The rounded protrusions 54 have a width dimension to correspond to the width of the gaps or recesses 34 of the male connectors 26, as seen in FIG. 5 and are spaced about the perimeter of the annular aperture 50 in common alignment with the recesses 34, such that the spacing corresponds to the spacing of the recesses 34 about the annular inner aperture 50 of the male connectors 26 as seen in FIG. 5. With the protrusions 54 in common alignment with the recesses 34, the protrusions 54 can collectively be moved into and out of the recesses 34 as the laths 14, 16 are rotated relative to each other. The diameter of the annular aperture 50 is dimensioned such that the male connectors 26 may be received therein.

Figure 8:
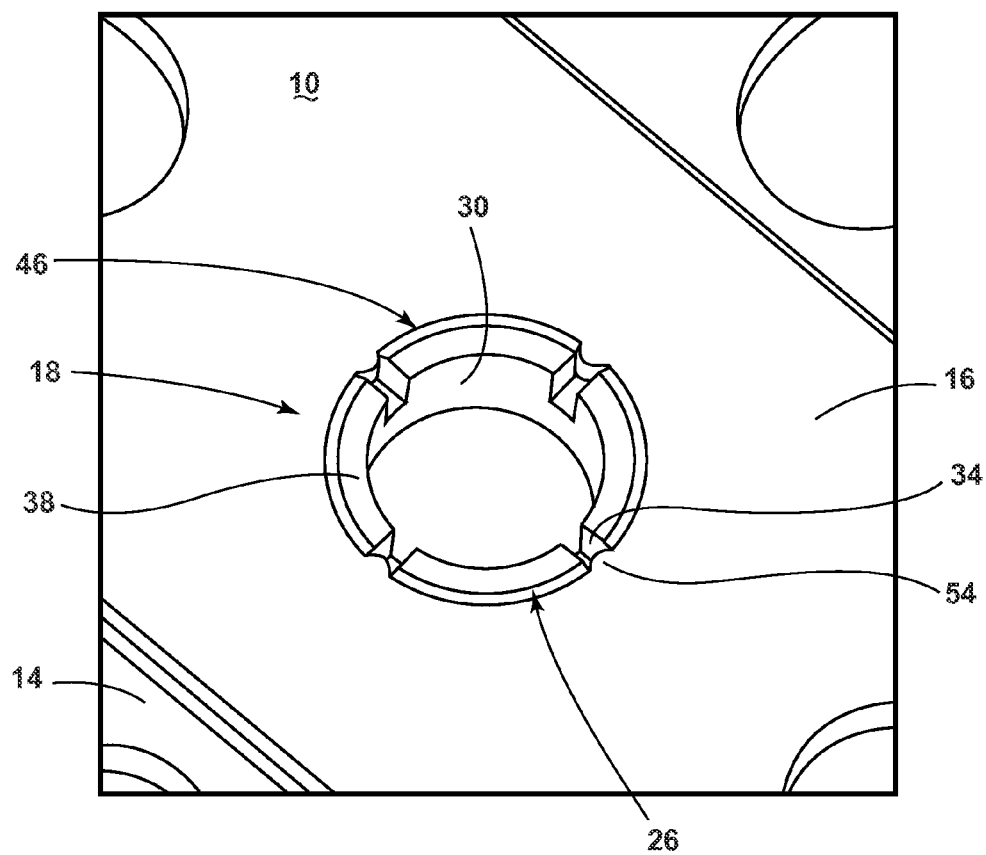
FIG. 8 is a perspective view of interlocking connectors of the lattice of FIG. 1, with portions removed for clarity.

FIG. 8 is a perspective view of the interlocking connector 18. The flanges 40 (shown in FIG. 4) have been removed from the body 30 of the male connector 26 for clarity so as to show the legs 38 and the recesses 34. The interlocking connector 18 comprises the male and female connectors 26, 46 on the laths 14, 16. The body 30 of the male connector 26 of the first lath 14 is inserted into the annular aperture 50 of the female connector 46 of the second lath 16. The aperture 50 is positioned within the perimetrical lip 32, thereby pivotally mounting the connectors 26, 46 together. The flanges 40 making up the perimetrical lip 32, not shown, may be made of compliant material such that is deflects inwardly when the inclined surface 42 contacts the outer perimeter of the annular aperture 50 until the male connector 26 is fully inserted, such the lip 32 contacts the flat surface of the second lath 16 and holds the first and second laths 14, 16 together. The taper of the inclined surface 42 facilities insertion of the male connector 26 into the female connector 46. When in the expanded configuration as shown, the recesses 34 and the rounded protrusions 54 align such that the rounded protrusions 54 extend into the recesses 34, holding the first and second laths 14, 16 in a perpendicular relationship and forming an interlocking connection. The interlocking connection can be configured to be removable, or such that the female connector 46 cannot be removed from the male connector 26 without damage.

When moved to the collapsed configuration as shown in FIG. 2, the male connectors 26 and female connectors 46 rotate in opposite directions, causing the rounded protrusions 54 and recesses 34 to be misaligned, with the protrusions 54 positioned outside the recesses 34. When the sheet of lattice 10 is folded, the protrusions 54 in the female connector 46 overlap the male connector 26, creating interference. The rounded protrusions 54 exert a slight force on the legs 38 of the male connector 26 causing the legs 38 to slightly deflect inwards and allow for rotation of the first and second laths 14, 16. This provides a small amount of resistance as a user expands the sheet of lattice 10 in an accordion manner. The protrusions 54 and recesses 34 can line up when the laths 14, 16 are perpendicular to one another, indicating to the user that the lattice 10 is ready for use.

When moving the lattice 10 back to the expanded configuration, the rounded protrusions 54 snap back into the recesses 34, indicating that the first and second laths 14, 16 are perpendicular to each other and that the lattice 10 is in the expanded configuration. A user is thereby provided with tactile feedback when the lattice 10 is in the proper expanded configuration. It will be understood that the male and female connectors 26, 46 may configured such that the first and second laths 14, 16 are not perpendicular in the expanded configuration of the lattice, such that the lattice voids 22 may have a plurality of shapes.

Further, which all of the male connectors 26 are shown on one lath 14 and all of the female connectors 46 are shown on the other lath 16, in other embodiments one lath 14, 16 can comprise a mixture of male and female connectors 26, 46, with the other lath 14, 16 being provided with a corresponding mixture of female and male connectors 26, 46.

Still further, while the male and female connectors 26, 46 are shown as being spaced at regular intervals along the laths 14, 16, other embodiments of the lattice 10 can include connectors having irregular spacing for a staggered look.

Figure 9:
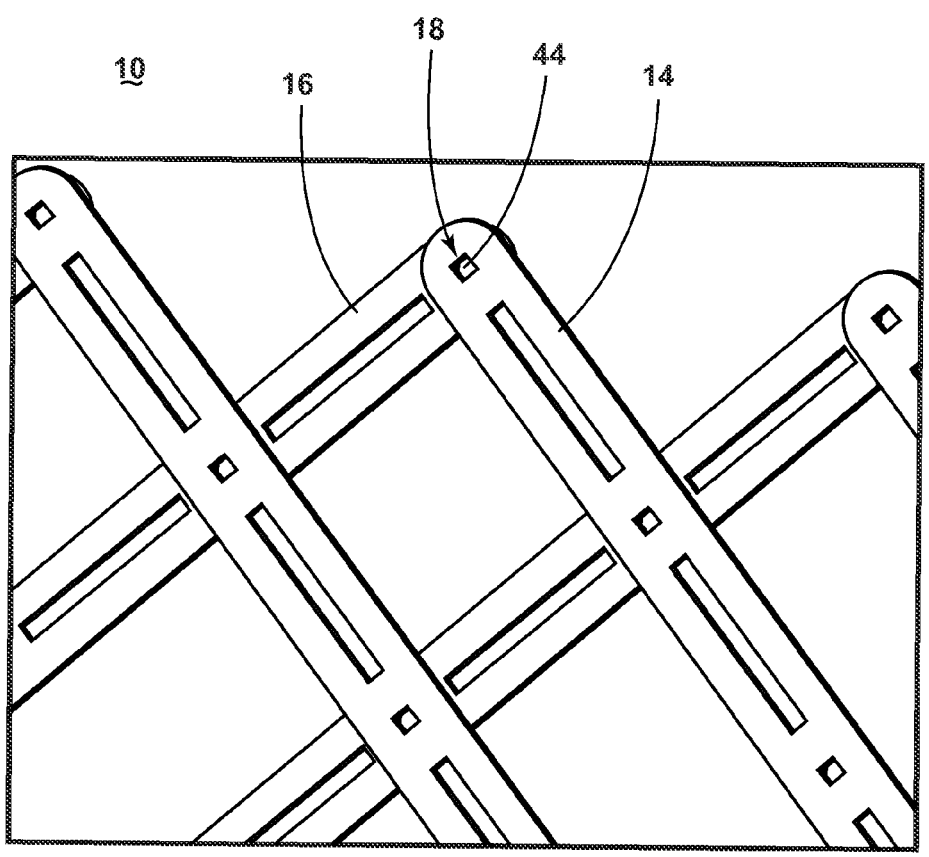
FIG. 9 is a front view of a lattice having an expanded framework according to a second embodiment of the invention.

In the embodiment of the connector 18 illustrated in FIGS. 1-8, both the male and female connectors 26, 46 are circular. Other shapes for the connectors are also possible. One example is shown in FIG. 9, which is a front view of a lattice 10 having an expanded framework according to a second embodiment of the invention. The lattice may be substantially identical to the lattice 10 of FIGS. 1-8, and like elements are referred to with the same reference numerals.

In FIG. 9, the inner aperture 44 of the male connector 26 of the interlocking connector 18 forms a square shape for aesthetics and/or functionality. The female connector 46 may be circular as shown in FIGS. 1-8, or may be square as well.

Figure 10:
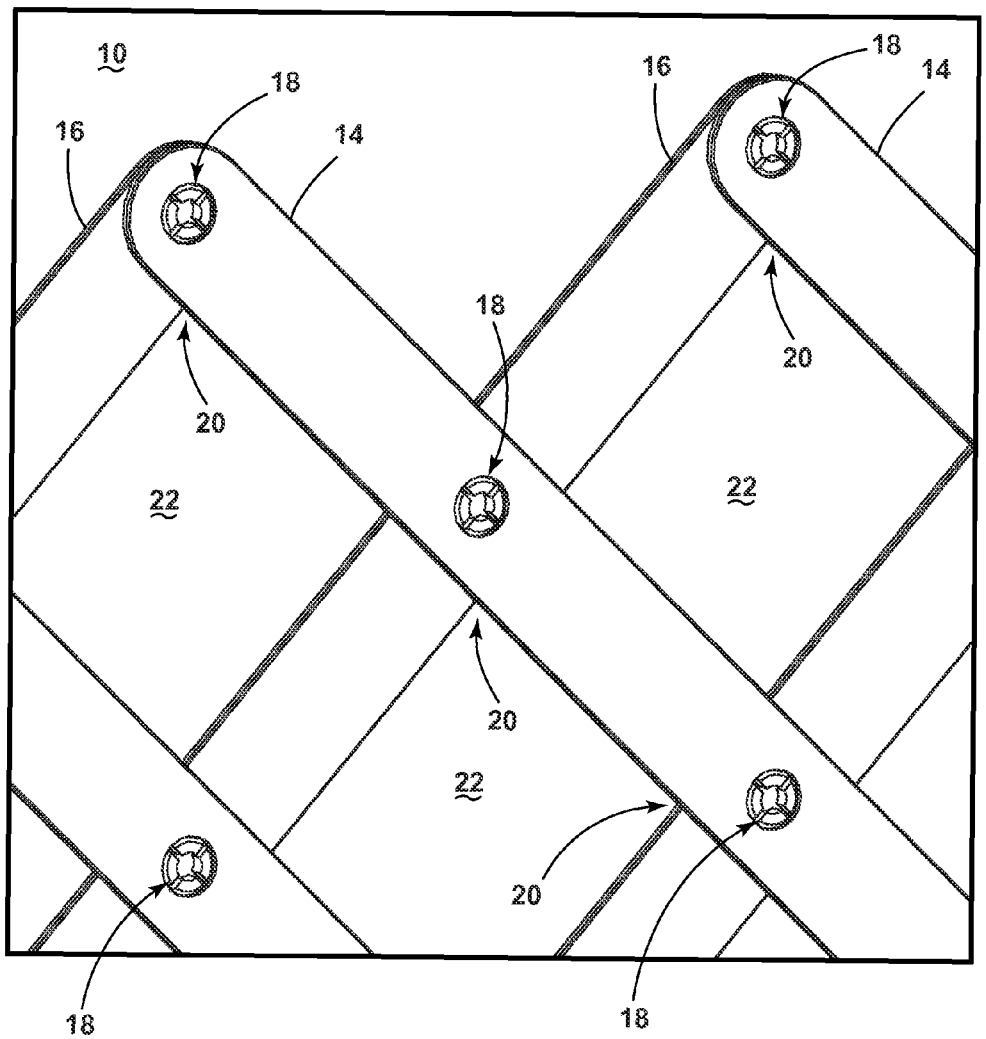
FIG. 10 is a front view of a lattice having an expanded framework according to a third embodiment of the invention.
Figure 11:
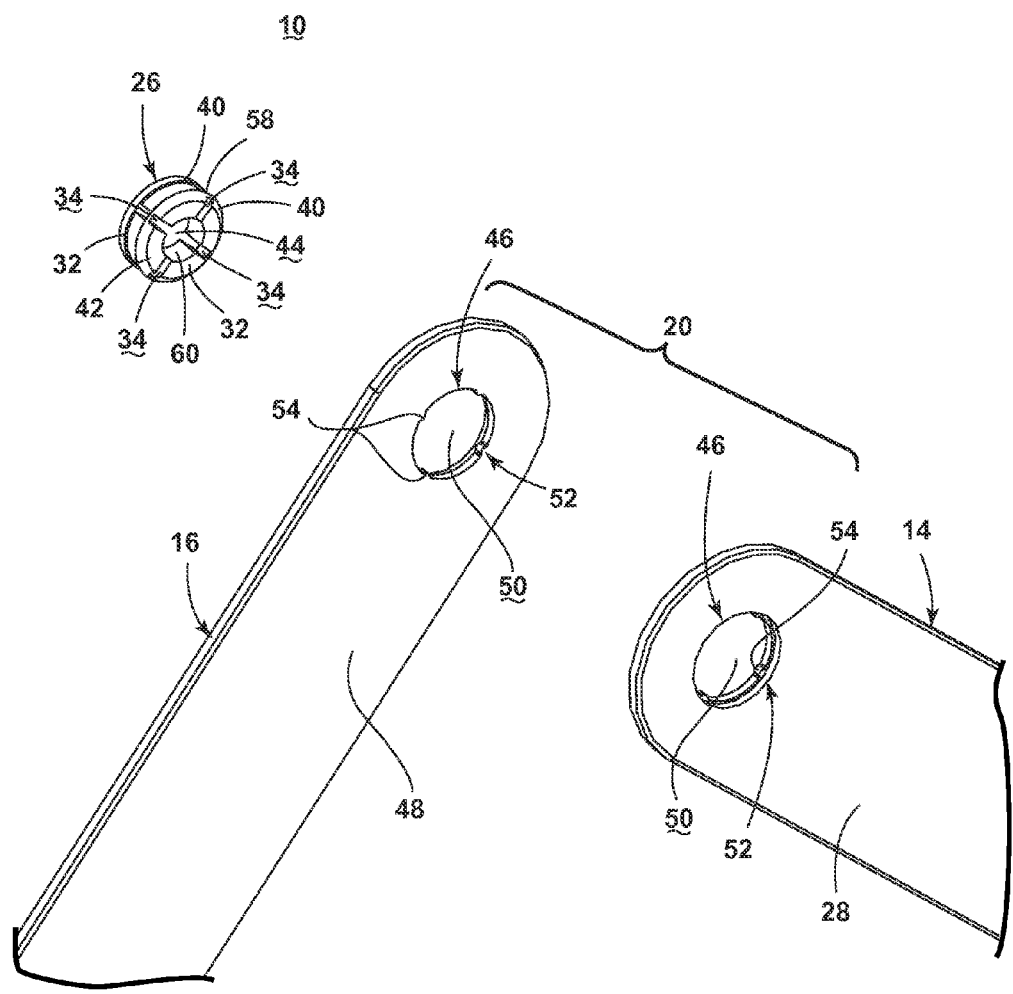
FIG. 11 is an exploded view of a portion of the lattice of FIG. 10.

FIGS. 10-11 show a lattice 10 according to a third embodiment of the invention. The lattice 10 may be substantially identical to the lattice 10 of FIGS. 1-8, and like elements are referred to with the same reference numerals. The lattice of FIG. 10 includes female connectors 46 in each of the laths 14, 16 that are in register with each other at the intersections 20 between the laths 14, 16. The male connector 26 is formed as a separate plug member 58. The pivotal connection 18 at the intersections 20 is formed by inserting the plug member 58 into the apertures 50 of the female connectors 46 of both laths 14, 16. The plurality of detents 52 on the female connectors 46 on each of the first and second laths 14, 16 can be aligned in one of the collapsible or extended configurations of the lattice 10.

The plug member 58 can have a dual-sided configuration similar to the single-sided configuration of the male retainer 26 shown in FIGS. 3-5. The plug member 58 includes a pair of juxtaposed exterior perimetrical lips 32, and, when the apertures 50 in the female connectors 46 are positioned within one of the perimetrical lips 32 on the plug member 58, the laths 14, 16 are thereby pivotally mounted to each other. Each lip 32 can include a plurality of recesses 34 in a spaced relationship. The recesses 34 may extend along an interior surface 60 of the plug member 58 between opposite sides of the male connector 26, such that one recess 34 can accommodate a protrusion 54 from each lath 14, 16. Alternatively, an individual recess 34 can be provided for each protrusion 54. Each lip 32 can further include be provided with the inclined surface 42 on the flange 40 that can taper in a direction away from the center of the plug member 58, thereby forming a tapered outer surface.

As noted above, the materials and dimensions for the laths 14, 16 making up the lattice may vary. In one example that is applicable to any of the embodiments shown herein, the first and second laths 14, 16 may be in the range of 0.125" thick and 1.25" wide with the male connectors 26 having a diameter of around 0.50" and the female connectors 46 having a diameter of slightly larger than 0.50" and both spaced at regular intervals of 4.16" along the first and second laths 14, 16. Laths 14, 16 with such dimensions can be injection-molded plastic, including, but not limited to, high density polyethylene, low density polyethylene, polyethylene terephthalate, polypropylene or polystyrene.

The embodiments of the invention provide for a number of benefits including that it allows the lattice to be stored, shipped, displayed and/or transported in the collapsed configuration, reducing the space required for storage, shipping and displaying and thereby saving on warehousing, shipping costs, and merchandizing costs while also allowing for easy transportation by the user. Traditional lattices are assembled in large sheets by the manufacturer. The lattice is sold in sheet form, which is difficult to transport and handle, especially for the end consumer. The lattice of the embodiments of the invention shown herein can be collapsed after initial assembly so that that lattice can be stored, shipped, or transported in a compact configuration, and expanded on-site.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A lattice movable between a collapsed configuration and an expanded configuration, comprising:
    a plurality of laths including a first lath crossing a second lath at an intersection; and
    a pivoting connector located at the intersection between the first lath and the second lath, the pivoting connector allowing the first and second laths to pivot relative to each other and comprising:
        a male retainer comprising a body having at least one exterior perimetrical lip and a plurality of recesses in a spaced relationship; and
        a female retainer comprising an opening and a plurality of detents extending into the opening in a common alignment with the plurality of recesses on the male retainer;
    wherein, when the opening in the female retainer is positioned within the perimetrical lip on the male retainer, the female retainer is thereby pivotally mounted to the male retainer for movement of the lattice between the collapsed configuration and the expanded configuration by the relative pivoting of the first and second laths, and the positioning of the detents on the female retainer within the corresponding recesses on the male retainer corresponds to the expanded configuration of the lattice.

2. The lattice according to claim 1 wherein the first lath comprises the male retainer and the second lath comprises the female retainer, wherein when the openings in the female retainer is positioned within the perimetrical lip on the male retainer, the first and second laths are thereby pivotally mounted to each other.

3. The lattice according to claim 1 wherein a plurality of laths comprises a series of first laths and a series of second laths which cross the series of first lathes at a plurality of intersections.

4. The lattice according to claim 1, wherein the first lath and the second lath have an opening in register with each other at the intersection between the first lath and the second lath.

5. The lattice according to claim 4, wherein the male retainer is integrally formed around the opening in the first lath, and the female retainer opening forms the opening in the second lath.

6. The lattice according to claim 5, wherein the perimetrical lip on the male retainer extends laterally outwardly from the opening in the first lath.

7. The lattice according to claim 6, wherein the perimetrical lip on the male retainer comprises a tapered outer surface for facilitating insertion through the female retainer opening in the second lath.

8. The lattice according to claim 7, wherein the plurality of detents on the female retainer comprise rounded protrusions extending inwardly from the female retainer opening.

9. The lattice according to claim 1, wherein the perimetrical lip on the male retainer comprises a tapered outer surface for facilitating insertion through the female retainer opening.

10. The lattice according to claim 1, wherein the plurality of detents on the female retainer comprise rounded protrusions extending inwardly into the opening of the female retainer.

11. The lattice according to claim 1 wherein the male retainer is formed as a separate plug member, and the first and second laths comprise female retainers at the intersection between the first lath and the second lath, and wherein the pivotal connector at the intersection is formed by inserting the plug member within the openings of the female retainers of both the first and second laths.

12. The lattice according to claim 11 wherein the plug member comprises a pair of juxtaposed exterior perimetrical lips, and, when the openings in the female retainers are positioned within one of the perimetrical lips on the plug member, the first and second laths are thereby pivotally mounted to each other.

13. The lattice according to claim 11 wherein the male retainer has oppositely-disposed tapered surfaces on opposite sides thereof for facilitating insertion into the openings of the female retainers.

14. The lattice according to claim 13 wherein an interior surface on the male retainer comprises the plurality of recesses, and wherein each recess thereof extends between opposite sides of the male retainer.

15. The lattice according to claim 1 wherein the male retainers and female retainers are circular.

16. The lattice according to claim 1 wherein at least one of the male retainer or the female retainer is square.

17. The lattice according to claim 1 wherein the first and second laths have at least one elongated slot between ends thereof.

18. The lattice according to claim 17 wherein the at least one elongated slot comprises a plurality of elongated slots formed in the first and second laths between the intersections of the first and second laths.

19. A lattice movable between a collapsed configuration and an expanded configuration, comprising:
    a plurality of laths including a first lath crossing a second lath at an intersection; and
    a pivoting connector located at the intersection between the first lath and the second lath, the pivoting connector comprising:
        a male retainer comprising a body having at least one exterior perimetrical lip and a plurality of recesses in a spaced relationship; and
        a female retainer comprising an opening and a plurality of detents extending into the opening in a common alignment with the plurality of recesses on the male retainer;
    wherein, when the opening in the female retainer is positioned within the perimetrical lip on the male retainer, the female retainer is thereby pivotally mounted to the male retainer, and the positioning of the detents on the female retainer within the corresponding recesses on the male retainer corresponds to the expanded configuration of the lattice,
    wherein the positioning of the detents on the female retainer outside the corresponding recesses on the male retainer corresponds to the collapsed cnfiguration of the lattice.

* * * * *